MULTIPLEXING DEVICE HAVING TUNABLE FERROMAGNETIC RESONATORS
INTERPOSED BETWEEN TWO OUT-OF-PHASE TRANSMISSION LINES
Filed April 16, 1969

INVENTORS.
DANIEL C. BUCK
ROBERT A. MOORE
BY
Ernest P. Klipfel
ATTORNEY 3,560,884

MULTIPLEXING DEVICE HAVING TUNABLE FERROMAGNETIC RESONATORS INTERPOSED BETWEEN TWO OUT-OF-PHASE TRANSMISSION LINES

Robert A. Moore, Severna Park, and Daniel C. Buck, Hanover, Md., assignors to Westinghouse Electric Corporation, Pittsburgh, Pa., a corporation of Pennsylvania Filed Apr. 16, 1969, Ser. No. 816,753
Int. Cl. H03h 7/10; H01p 5/12
U.S. Cl. 333—6 5 Claims

ABSTRACT OF THE DISCLOSURE

A multiplexing device is disclosed employing a plurality of ferromagnetic resonators which couple all wave energy within their respective operating bands from a broad band of wave energy propagating along a pair of parallel wave energy transmission lines and transmit the coupled energy to associated secondary wave energy transmission lines positioned adjacent each of the resonators.

BACKGROUND OF THE INVENTION

(1) Field of the invention

This invention relates to a multiplexing device, and more particularly to a multiplexing device for separating a plurality of discrete channels or bands of frequencies from a broad band of wave energy.

(2) Description of the prior art

It may be explained that it is desirable in some applications such as spectrum surveillance receivers to divide a broad band of wave energy into many narrow channels in order that signals at different frequencies within the broad band be processed independently of each other. At low frequencies, multiplexing, i.e., separation of signals by frequency, means connecting as many filters as are needed to a common connection point. This scheme is not practical at microwave frequencies because at high frequencies filter lead lengths become significant portions of a wavelength causing high insertion losses. At microwave frequencies, various arrangements of filters, hybrids and circulator couplings have been utilized in attempts to minimize losses while separating a very broad spectrum of wave energy into discrete channels. However, while the use of these elements in conventional microwave circuitry has proven somewhat satisfactory, in integrated circuitry the insertion loss of these circuits is typically one half db or greater and multiple signal division and filtering leads to significant losses.

SUMMARY OF THE INVENTION

As an overall object, the present invention seeks to provide electronically tunable multiplexing in a form suitable for integrated circuits without resorting to the use of multiple hybrids or circulators and the inherent losses produced by these elements.

In accordance with the invention, a multiplexing device is provided which includes a pair of parallel wave energy transmission lines. Means are provided for feeding a broad band of wave energy into both of the transmission lines with the wave energy in one transmission line being shifted in phase with respect to that in the other. At least one filtering means, preferably a ferromagnetic resonator, is provided having an operating band smaller than but within the broad band of wave energy. The filtering means is interposed between the transmission lines and in the paths of both of the traveling wave magnetic fields produced by the wave energy propagating along the transmission lines. At least one secondary wave energy transmission line is positioned adjacent the filtering means and has coupled thereto the wave energy within the operating band of the filtering means.

The above and other objects and features of the invention will become apparent from the following detailed description taken in connection with the accompanying drawings which form a part of this specification.

DESCRIPTION OF THE PREFERRED EMBODIMENTS

Figure 1:
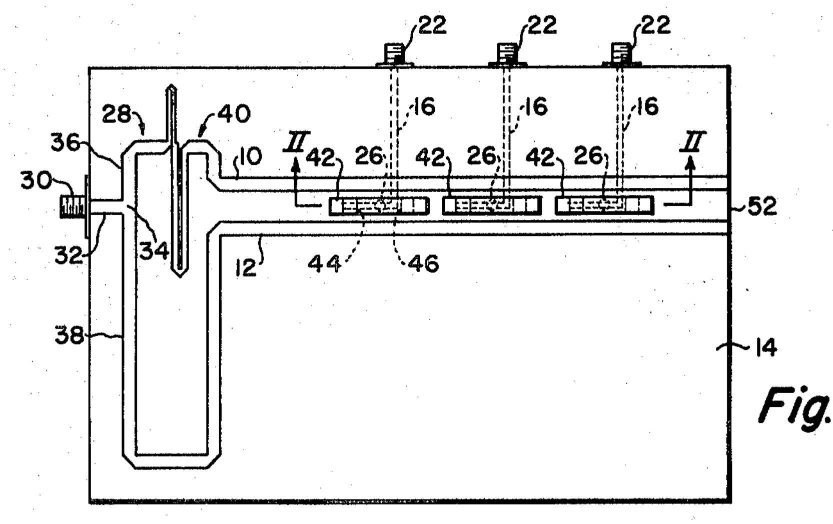
FIG. 1 is a top view of a multiplexing device in accordance with the invention.
Figure 2:
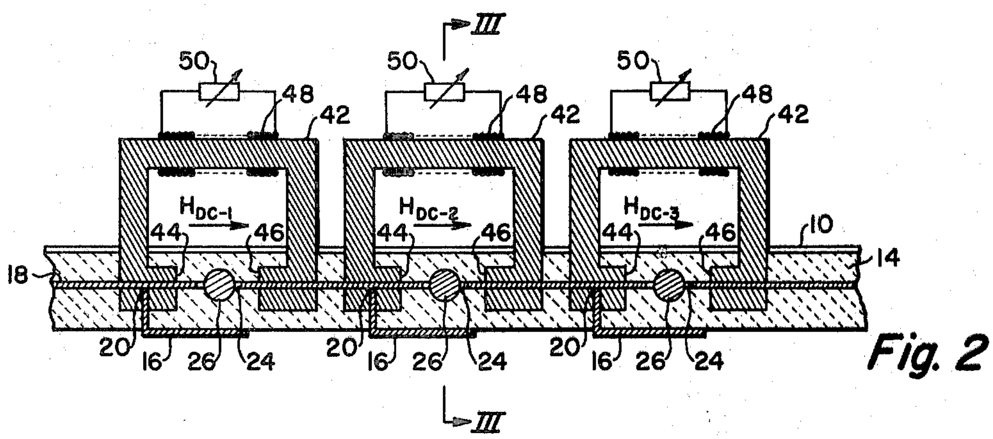
FIG. 2 is a partial sectional view taken along the line II—II of FIG. 1.
Figure 3:
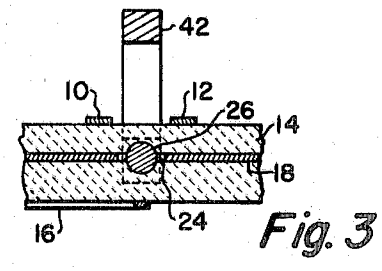
FIG. 3 is a partial sectional view taken along the line III—III of FIG. 2.

With reference now to the drawings and particularly to FIGS. 1, 2 and 3, the multiplexing device of the invention comprises a pair of parallel microstrip wave energy transmission lines 10 and 12 on a suitable dielectric substrate 14 such as alumina. As best seen in FIG. 2, on the opposite side of the substrate 14, there is provided a plurality of microstrip secondary wave energy transmission lines 16. Parallel to the upper and lower surfaces of the substrate 14, and disposed between the transmission lines 10 and 12 and the secondary transmission lines 16, is a conductive member 18 to which the secondary transmission lines 16 are shorted at one end as is shown at 20. The opposite ends of each of the secondary transmission lines are connected as shown to connectors 22 adapted for connection to coaxial wave transmission lines.

The conductive member 18 has a plurality of openings 24 therethrough and disposed within each of the openings 24 there is provided a filtering means or ferromagnetic resonator 26 in accordance with the invention. Each of the ferromagnetic resonators 26 is an element of "gyromagnetic material." The term "gyromagnetic material" is employed here in a broad sense as designating the class of magnetically polarizable materials having unpaired spin systems involving portions of the atoms thereof that are capable of being aligned by an external magnetic polarizing field. In the particular embodiment of the invention shown, yttrium-iron-garnet is used (often referred to as "YIG").

That such materials can be used as a filtering element in microwave transmission lines is well known to those skilled in the art. It is also known to those skilled in the art that if a circularly polarized magnetic field is provided in a plane substantially perpendicular to a static magnetic field in a body of gyromagnetic material, that magnetic coupling can be effected between wave energy propagating in one circuit and another circuit in proximity thereto. Both the filtering and coupling properties of gyromagnetic materials are utilized in the present invention.

Returning now to FIG. 1, also provided on the upper surface of the substrate 14, are means, shown generally at 28, for feeding or applying a broad band of wave energy into the transmission lines 10 and 12 such that the wave energy propagating in one transmission line is shifted in phase with respect to that in the other. The purpose for having this phase difference will become apparent hereinafter. An input connector 30, adapted for connection to a coaxial wave transmission line, is provided, which is connected to an input path 32. Input power applied through connector 30 is divided equal at the T-junction 34 and propagates along the two arms 36 and 38 connected to the transmission lines 10 and 12, respectively. In traversing the portion of the arm designated generally at 40, the wave energy propagating in arm 36 is shifted 90° in phase relative to the wave energy propagating in arm 38. Such power splitters and phase shifters are well known in the art and are described in an article by B. M. Schiffman, entitled, "A New Class of Broad-Band Microwave 90-Degree Phase Shifters," published in IRE Transactions on Microwave Theory and Techniques, April 1958, vol. 6, No. 2, pages 232–237.

In order to provide a direct current biasing field which will pass through each of the YIG resonators 26 in the direction of propagation of wave energy in the lines 10 and 12, a plurality of C-shaped magnetic cores 42 are provided having pole pieces 44 and 46. Turns of wire 48 are wound on the cores 42 and connected to a variable source of magnetizing current 50. The biasing fields for each YIG resonator, from left to right in FIG. 2, are designated as $H_{DC-1}$, $H_{DC-2}$ and $H_{DC-3}$. Each of the biasing fields may, however, be supplied by a permanent magnet constructed with suitable means for varying the magnetic flux.

Figure 4:
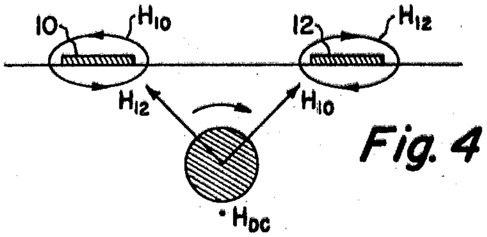
FIG. 4 is an enlarged view similar to FIG. 3, but with some parts omitted, illustrating the magnetic fields associated with each of the parallel transmission lines and a vector diagram of the magnetic fields in the region of the ferromagnetic resonators.

Important to the operation of the multiplexing device of the invention is the fact that each of the YIG resonators, is subject to a circularly polarized magnetic field. That there is such a circularly polarized field present can be seen in FIG. 4. Magnetic fields produced by the wave energy traveling in the strips 10 and 12 circulate around them as is shown in FIG. 4 and are, for the most part, perpendicular to the biasing field $H_{DC}$. The magnetic vectors $H_{10}$ and $H_{12}$, therefore are perpendicular to the direction of wave propagation. As stated above, the wave energy propagating in the strips 10 and 12 are 90° out of phase, and since $H_{10}$ lags $H_{12}$ by 90°, the effect is a rotating magnetic field. For the indicated phase relationship, the rotational direction is from $H_{12}$ to $H_{10}$ as indicated by the arrow in FIG. 4.

From the foregoing description it will be understood that if a broad band of wave energy is applied at input path 32, the wave energy will divide equally between the arms 36 and 38 resulting in the wave energy applied to microstrip 10 being shifted in phase 90° relative to that in microstrip 12. Due to the circularly polarized field at each of the YIG resonators and the fact that each acts as a filter at its resonant frequency, the respective YIG resonators 26 couple all energy within their respective operating bands and transmit it to their associated secondary transmission lines 16. In this manner the applied broad band of wave energy is divided into a plurality of discrete channels or bands which may be transmitted via connectors 22 to suitable output utilization means. The resonators 26 can be individually tuned by varying the magnetic fields $H_{DC}$ and therefore, the operating band of each of the resonators can be varied.

All input wave energy not picked off by one of the resonators 26 can be transmitted from the end 52 of the multiplexing device or be dumped in an internal load (not shown). While only three resonators 26 have been shown it should be understood that additional ones can be utilized depending on the number of divisions to be made to the broad spectrum of wave energy applied to the multiplexing device.

Although the invention has been shown in connection with a specific embodiment, it will be readily apparent to those skilled in the art that various changes in form and arrangement of parts may be made to suit requirements without departing from the spirit and scope of the invention.

We claim as our invention:

1. In a multiplexing device, the combination of a pair of parallel wave energy transmission lines, means for feeding a broad band of wave energy into both of said transmission lines with the wave energy propagating along one transmission line being shifted in phase with respect to that in the other, at least one ferromagnetic resonator having an operating band smaller than but within said broad band interposed between said transmission lines and in the paths of both of the traveling wave magnetic fields produced by wave energy propagating along said transmission lines, and at least one secondary wave energy transmission line positioned adjacent said ferromagnetic resonators and having coupled thereto wave energy within the operation band of said ferromagnetic resonator.

2. In a multiplexing device, the combination of:

a pair of parallel wave energy transmission lines, means for feeding a broad band of wave energy into both of said transmission lines with the wave energy propagating along one transmission line being shifted in phase with respect to that in the other, a plurality of filtering means, each of said filtering means being disposed at longitudinally spaced regions between said transmission lines and in the paths of both of the traveling wave magnetic fields produced by wave energy propagating along said transmission lines, each of said filtering means being resonantly tuned to a predetermined operating band of frequencies and arranged to separate from said borad band of wave energy a band of frequencies of smaller bandwidth that said broad band, and a plurality of secondary wave energy transmission lines, each of said secondary transmission lines being positioned adjacent one of said filtering means and having coupled thereto wave energy within the operating band of its associated filtering means.

3. The combination according to claim 2 wherein each of said filtering means comprises an element of gyromagnetic material, and including means for applying a variable magnetic field to each of said elements to individually tune each of said elements whereby the operating band of each of said elements can be varied.

4. The combination according to claim 2 including a common conductive member forming a ground plane disposed between said pair of parallel wave energy transmission lines and said plurality of secondary wave transmission lines, said common conductive member having a plurality of openings therethrough with a filtering means disposed in each of said openings.

5. The combination according to claim 2 wherein said pair of parallel wave energy transmission lines are microstrip transmission lines and said plurality of secondary wave energy transmission lines are microstrip transmission lines.

References Cited

UNITED STATES PATENTS

| | | | |
|---|---|---|---|
| 2,874,356 | 2/1959 | Peterson | 333—6(UX) |
| 2,922,123 | 1/1960 | Cohn | 333—6X |
| 3,017,584 | 1/1962 | Lundry | 333—6 |
| 3,292,075 | 12/1966 | Wenzel | 333—6X |
| 3,324,419 | 6/1967 | Kuroda et al. | 333—6 |

HERMAN K. SAALBACH, Primary Examiner

T. VEZEAU, Assistant Examiner

U.S. Cl. X.R.

333—73